United States Patent [19]

Haraguchi

[11] Patent Number: 5,361,110
[45] Date of Patent: Nov. 1, 1994

[54] CAMERA

[75] Inventor: Shosuke Haraguchi, Kanagawa, Japan

[73] Assignee: Canon Kabushiki Kaisha, Tokyo, Japan

[21] Appl. No.: 862,510

[22] Filed: Apr. 2, 1992

[30] Foreign Application Priority Data

Apr. 4, 1991 [JP] Japan .................... 3-071698

[51] Int. Cl.⁵ ............................ G03B 9/08
[52] U.S. Cl. ............................ 354/234.1
[58] Field of Search ................. 354/234.1

[56] References Cited

U.S. PATENT DOCUMENTS

| 4,306,793 | 12/1981 | Date et al. | 354/152 |
|---|---|---|---|
| 4,364,654 | 12/1982 | Senuma et al. | 354/234 |
| 4,410,256 | 10/1983 | Sato et al. | 354/234 |
| 4,487,492 | 12/1984 | Toyoda et al. | 354/234.1 |
| 4,564,278 | 1/1986 | Ohmura | 354/195.12 |
| 4,799,074 | 1/1989 | Kawamura et al. | 354/173.1 |
| 4,864,336 | 9/1989 | Fukahori et al. | 354/152 |
| 4,958,175 | 9/1990 | Asakura et al. | 354/152 |

Primary Examiner—Richard A. Wintercorn
Assistant Examiner—Nicholas J. Tuccillo
Attorney, Agent, or Firm—Fitzpatrick, Cella, Harper & Scinto

[57] ABSTRACT

A camera includes a camera mechanism including a charging member which makes a reciprocating motion between a charging position and a charging-cancelling position; a motor for moving the charging member from the charging-cancelling position to the charging position; a first driving mechanism for driving the charging member from the charging position to the charging-cancelling position; and a second driving mechanism for driving the charging member only in the initial stage of the process of moving the charging member from the charging position to the charging-cancelling position.

23 Claims, 10 Drawing Sheets

CAMERA

BACKGROUND OF THE INVENTION

1. Field of the Invention

This invention relates to a camera of the kind arranged to charge the shutter, etc. thereof by using the driving force of a motor.

2. Description of the Related Art

The camera of the above-stated kind has been arranged to charge the shutter by driving a charging member with the driving force of a motor and to return the charging member to a retracted position prior to an exposure solely by means of a spring force, as described, for example, in U.S. Pat. No. 4,864,336.

The conventional arrangement requires a strong spring force in order to return the charging member without fail from its charging position to its retracted position prior to an exposure. The returning force must be large particularly in the neighborhood of the charging position of the charging member. The spring force must be arranged to be sufficiently strong. However, the strong spring force is undesirable as it causes a great impact and thus brings about a large impact sound and vibrations when the charging member is returned to the retracted position prior to an exposure. In addition to this problem, the strong spring force necessitates a large driving force in charging and thus causes an energy loss.

SUMMARY OF THE INVENTION

It is an object of this invention to provide a camera which is arranged to move a shutter charging member from a charging position to a charging-cancelling position by using a large driving force only in the initial stage of the moving process and by weakening the driving force at the charging-cancelling position, so that the moving process of the charging member can be quietly carried out with less vibration.

The above and other objects and features of this invention will become apparent from the following detailed description of embodiments thereof taken in connection with the accompanying drawings.

DETAILED DESCRIPTION OF THE PREFERRED EMBODIMENTS

Figure 1:
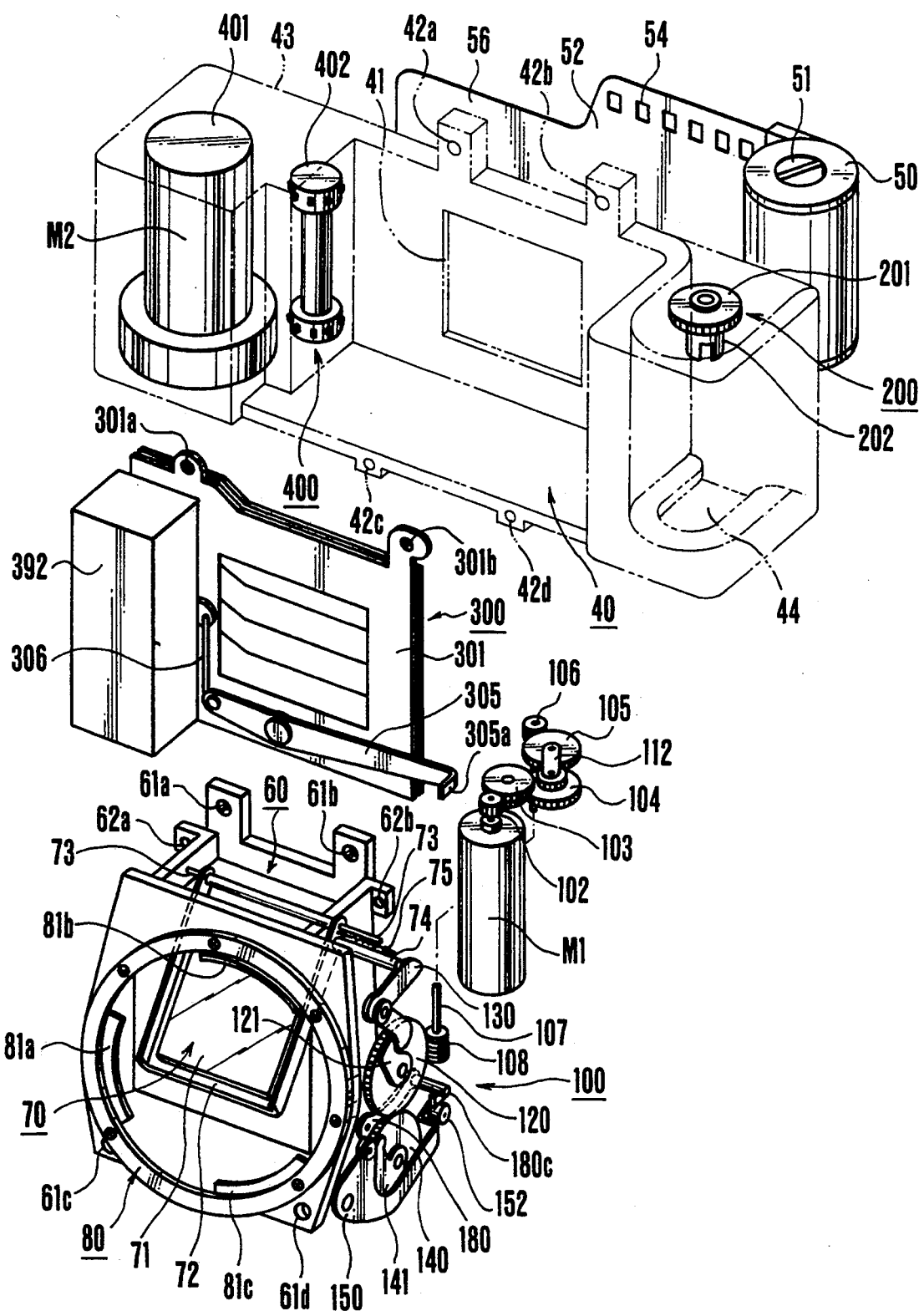
FIG. 1 is an oblique view showing a camera which is arranged according to this invention as a first embodiment thereof.

FIGS. 1 to 9 show a camera arranged according to this invention as a first embodiment thereof. Of these figures, FIG. 1 shows in an oblique view the whole driving mechanism of the camera. The arrangement of the camera is first described as a whole with reference to FIG. 1.

Figure 2:
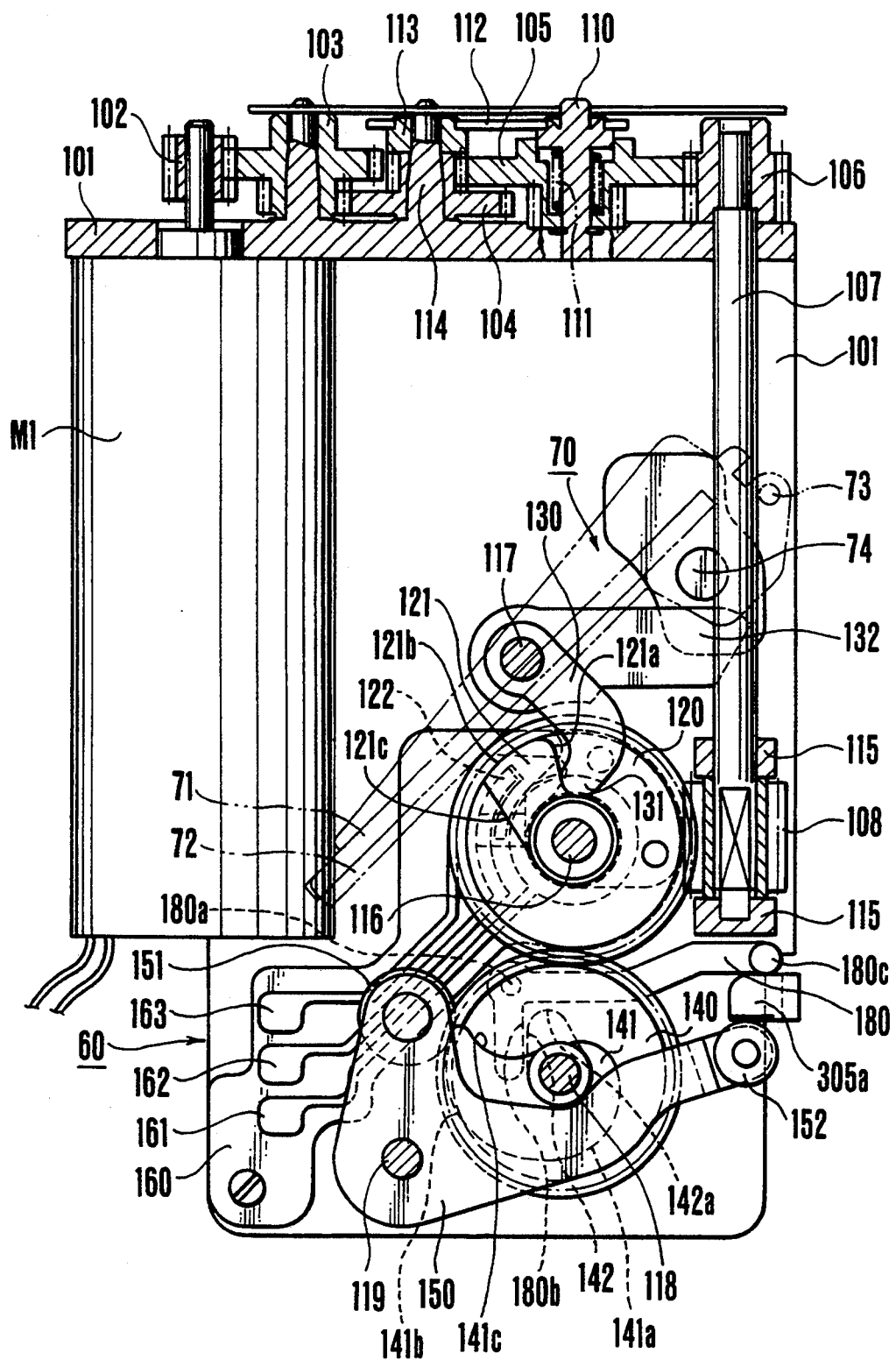
FIG. 2 shows the first embodiment in a state of having a mirror in a down position.
Figure 3:
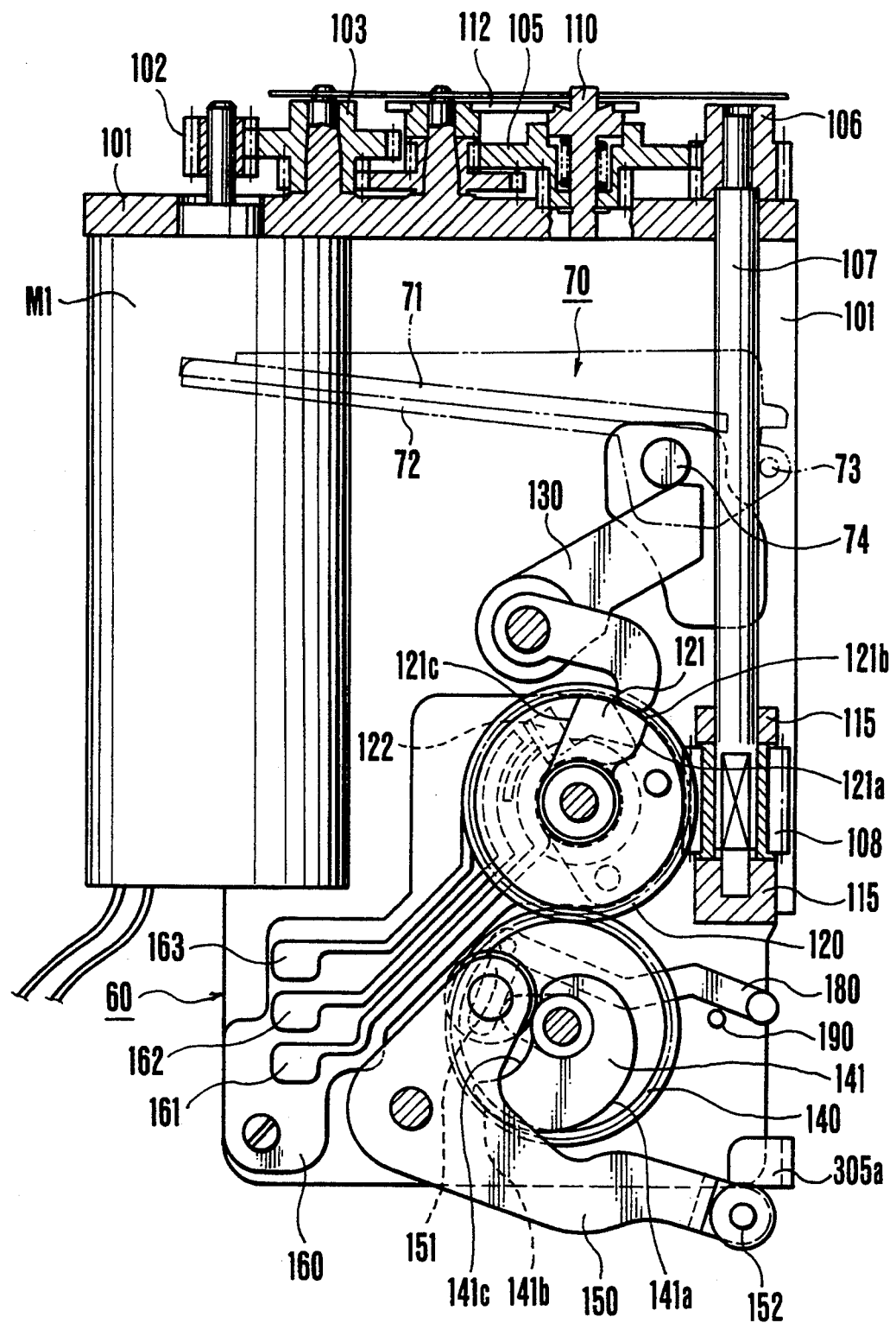
FIG. 3 shows the first embodiment in a state of having the mirror in an up position.

In FIG. 1, a reference numeral 40 denotes a camera body. Although the details of the camera body 40 are not shown in detail, the camera body 40 is molded with a plastic material as a whole. However, some parts that particularly require a high degree of precision and strength such as an area around an aperture 41, etc., are insert-molded with a metal material. Mounting holes 42a to 42d are provided for securing a mirror box 60 to the camera body 40 with screws. A numeral 43 denotes a spool chamber and a numeral 44 a film cartridge chamber. A film 52 which is coiled within a film cartridge 50 is provided with perforation 54 and a leader part 56. The mirror box 60 is provided with mounting holes 61a to 61d in positions corresponding to the mounting holes 42a to 42d of the camera body 40. The mirror box 60 is firmly screwed to the camera body 40 with the holes 61a to 61d adjusted respectively to the holes 42a to 42d. A movable mirror 70 is arranged to be pivotable between two positions. One position is a viewfinder sighting position, i.e., a mirror-down position as shown in FIGS. 1 and 2, in which the mirror 70 reflects to the optical system of a viewfinder (not shown) the light of a photographed object coming through a photo-taking lens (not shown). The other position is a retracted position for taking an exposure, i.e., a mirror-up position as shown in FIG. 3, in which the object light is directed toward the film 52. A mount 80 disposed on the side of the camera body 40 is screwed to the mirror box 60. The camera-side mount 80 is provided with bayonet claws 81a, 81b and 81c for bayonet coupling with a lens-side mount (not shown) of the photo-taking lens.

A reference numeral 100 denotes a mirror-box driving mechanism in its entirety. The whole mechanism is disposed at the mirror box 60. A numeral 200 denotes a film-rewinding driving mechanism in its entirety. A part of the film-rewinding driving mechanism 200 is disposed at the mirror box 60 while the rest is disposed on the side of the camera body 40. A first motor M1 is arranged to serve as a drive source for these two mechanisms 100 and 200. The first motor M1 is secured to the mirror box 60. A numeral 300 denotes a shutter unit in its entirety. The shutter unit 300 includes a shutter base plate 301. The shutter base plate 301 is provided with mounting holes 301a and 301b for mounting it on the mirror box 60. The shutter unit 300 is firmly screwed to the mirror body 60 by adjusting the mounting holes 301a and 301b respectively to corresponding mounting holes 62a and 62b formed in the mirror box 60. A numeral 400 denotes a film-winding driving mechanism in its entirety. Although the film-winding driving mechanism 400 is not shown in detail, the whole mechanism is unitized and is disposed in a spool chamber 43 of the camera body 40.

The details of the arrangement of the mirror-box driving mechanism 100 are described below with reference to FIGS. 2 and 5 together with FIG. 1:

A base plate 101 (see FIG. 2) is secured to one side (right side as shown in FIG. 2) of the mirror box 60. All the rotary wheels of the mirror-box driving mechanism 100 are rotatably carried by the base plate 101. The first motor M1 is provided with an output gear 102. A reduction gear 103 engages the output gear 102. A sun gear 104 engages the reduction gear 103. A planet gear 105 engages the sun gear 104. The sun gear 104 and the planet gear 105 are connected to each other by a planet lever 112. The planet gear 105 is thus arranged to make a planetary motion according to the rotating direction of the sun gear 104. More specifically, the planet gear 105 is friction-coupled by means of a coiled spring 111 with a planet shaft 110 which serves as a central shaft. A carrier 113 is loosely fitted on a boss 114 which is formed on the base plate 101 to serve as the central shaft of the sun gear 104. The carrier 113 is connected to the planet shaft 110 by the planet lever 112. When the sun gear 104 rotates counterclockwise, the planet gear 105 is first caused by the friction of the coiled spring 111 to revolve counterclockwise around the boss 114 and thus comes to engage a transmission gear 106. When the planet gear 105 engages the transmission gear 106, the friction of the coiled spring 111 is overcome by the driving force of the first motor M1 to allow the planet gear 105 to slip on the planet shaft 110. The planet gear 105 then rotates clockwise to transmit the rotation of the first motor M1 to the transmission gear 106.

When the sun gear 104 rotates clockwise, the planet gear 105 first revolves clockwise around the boss 114 to engage a film rewinding gear 201 which is included in a film rewinding system. When the planet gear 105 engages the film rewinding gear 201, the planet gear 105 rotates to transmit the rotation of the first motor M1 to the film rewinding gear 201.

The transmission gear 106 which rotates counterclockwise is disposed on the side of the motor of the mirror-box driving system. A transmission shaft 107 has its one end secured to the transmission gear 106 and its other end to a worm gear 108. The movement of the transmission shaft 107 in the directions of thrust is restricted by a receiving part 115 of the base plate 101 which is disposed in the two directions of thrust of the worm gear 108.

A mirror driving gear 120 is arranged to rotate clockwise by engaging the above-stated worm gear 108. A mirror driving cam 121 is formed on the obverse side of the mirror driving gear 120. A position detecting brush 122 which is made of a conductive material is secured to the reverse side of the mirror driving gear 120. The mirror driving gear 120 is rotatably carried by a boss 116 formed on the base plate 101. The mirror driving cam 121 has an upward cam face 121a which is for driving a mirror driving lever 130 counterclockwise; a flat cam face 121b which is for keeping the driving lever 130 in a turnable position (a mirror-up position); and a downward cam face 121c which is for allowing the driving lever 130 to turn clockwise.

The mirror driving lever 130 consists of two lever bodies which are fixedly connected to each other into an L shape. The mirror driving lever 130 is rotatably carried by a boss 117 on the base plate 101 and is arranged to act as a cam follower for the above-stated mirror driving cam 121. In other words, the mirror driving lever 130 is arranged to be driven to turn counterclockwise with its one end part 131 in sliding contact with the upward cam face 121a of the mirror driving cam 121; to be kept in the counterclockwise turning state with the one end part 131 in sliding contact with the flat cam face 121b; and to be allowed to turn clockwise (return) with the one end part 131 in sliding contact with the downward cam face 121c (or with the end part 131 in a position corresponding to the downward cam face 121c even if the end part 131 is actually not in contact with the downward cam face 121c). The other end part 132 of the mirror driving lever 130 is arranged to be controlled according to the turning position of each cam face of the above-stated mirror driving cam 121. Under this control, the other end part 132 of the mirror driving lever 130 moves the movable mirror 70 upward (turning the mirror 70 into a retracted position for an exposure) by pushing a mirror pin 74; keeps the mirror 70 in its up position by continuously pushing the mirror pin 74; and allows the mirror 70 to come back to its down position (back to a viewfinder sighting position) by cancelling a pushing operation of the mirror pin 74.

A shutter charging gear 140 is arranged to rotate counterclockwise by engaging the mirror driving gear 120. A shutter charging cam 141 is formed on the obverse side of the shutter charging gear 140 in one body with the gear 140. The shutter charging gear 140 is arranged to receive the driving force in a 1-to-1 ratio from the mirror driving gear 120 (reduction ratio of 1.0) and is rotatably carried by a boss 118 provided on the base plate 101. The above-stated shutter charging cam 141 consists of an upward cam face 141a for driving a shutter charging lever 150 counterclockwise; a flat cam face 141b for keeping the shutter charging lever 150 in its turned position (a charging state); and a downward cam face 141c for allowing the the shutter charging lever 150 to turn clockwise.

The shutter charging lever 150 which is in an L shape is rotatably carried by a boss 119 on the base plate 101 and is arranged to serve as a cam follower for the shutter charging cam 141. A roller 151 is carried by one end part of the shutter charging lever 150. The shutter charging lever 150 is thus arranged to be driven to turn counterclockwise when the roller 151 abuts on the upward cam face 141a of the shutter charging cam 141; to be kept in the counterclockwise turning state when the roller 151 abuts on the flat cam face 141b of the cam 141; and to be allowed to turn clockwise when the roller 151 comes to the downward cam face 141c of the cam 141. Another roller 152 is carried by the other end part of the shutter charging lever 150 and is arranged to be controlled according to the turning position of each of the cam faces of the above-stated shutter charging cam 141. Under this control, a shutter charging action is performed when the roller 152 pushes one end 305a of a seesaw lever 305 in a shutter unit 300. The shutter charging action continues by continuously pushing the seesaw lever 305. The details of the shutter unit 300 will be described later. In the case of this embodiment, the shutter unit 300 can be continuously charged by mechanically holding both the leading and trailing shutter curtains (or blades) in travel-ready positions where they are ready for traveling. The seesaw lever 305 is returned to its original position by cancelling a pushing operation onto the seesaw lever 305. With the seesaw lever 305 thus returned, the mechanical holding of the leading and trailing shutter curtains (or blades) in the travel-ready positions is cancelled. After that, the shutter can be allowed to travel by controlling currents applied to electromagnets provided for shutter control.

Figure 6:
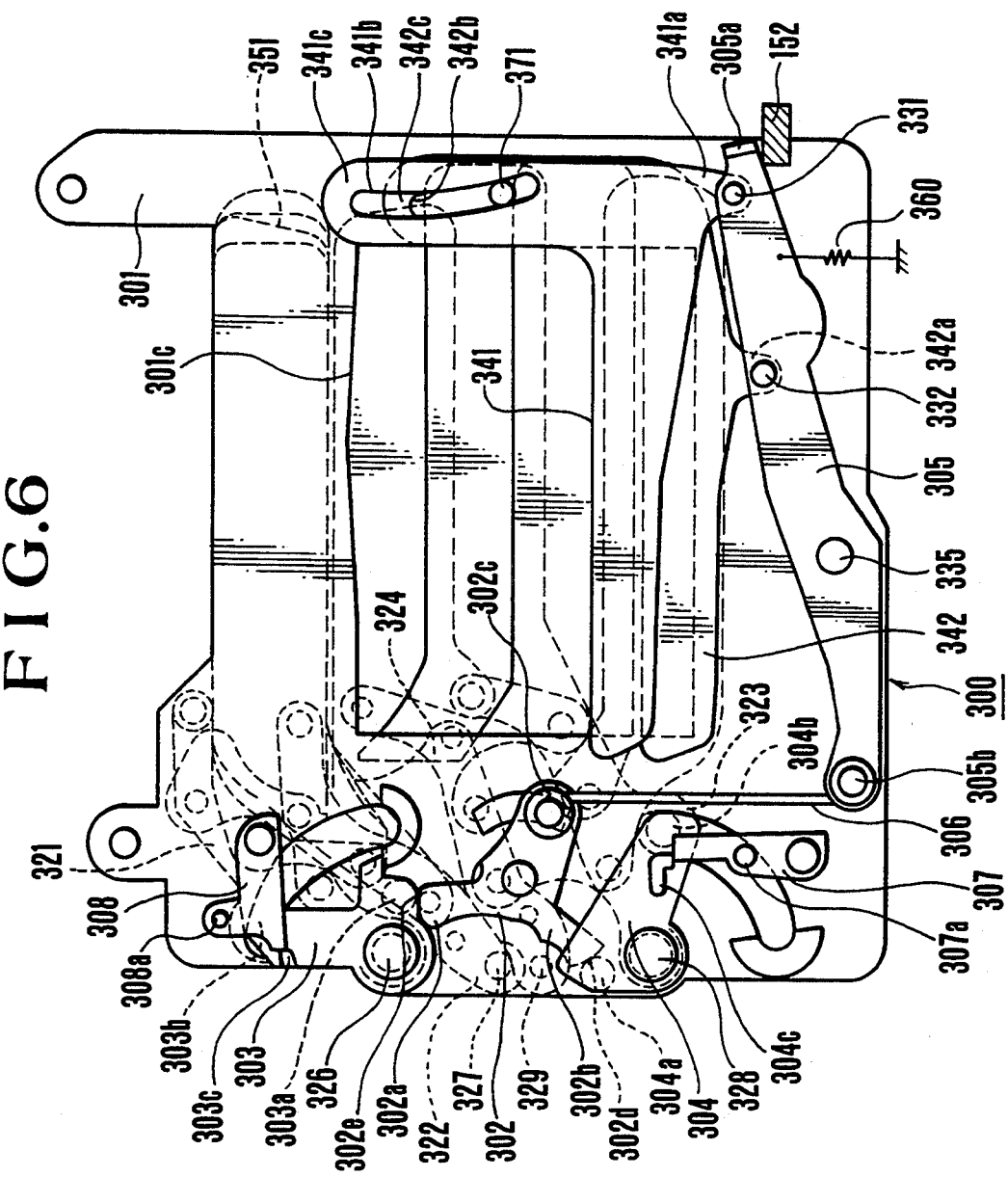
FIG. 6 shows the first embodiment having a shutter in a charged-up state.
Figure 7:
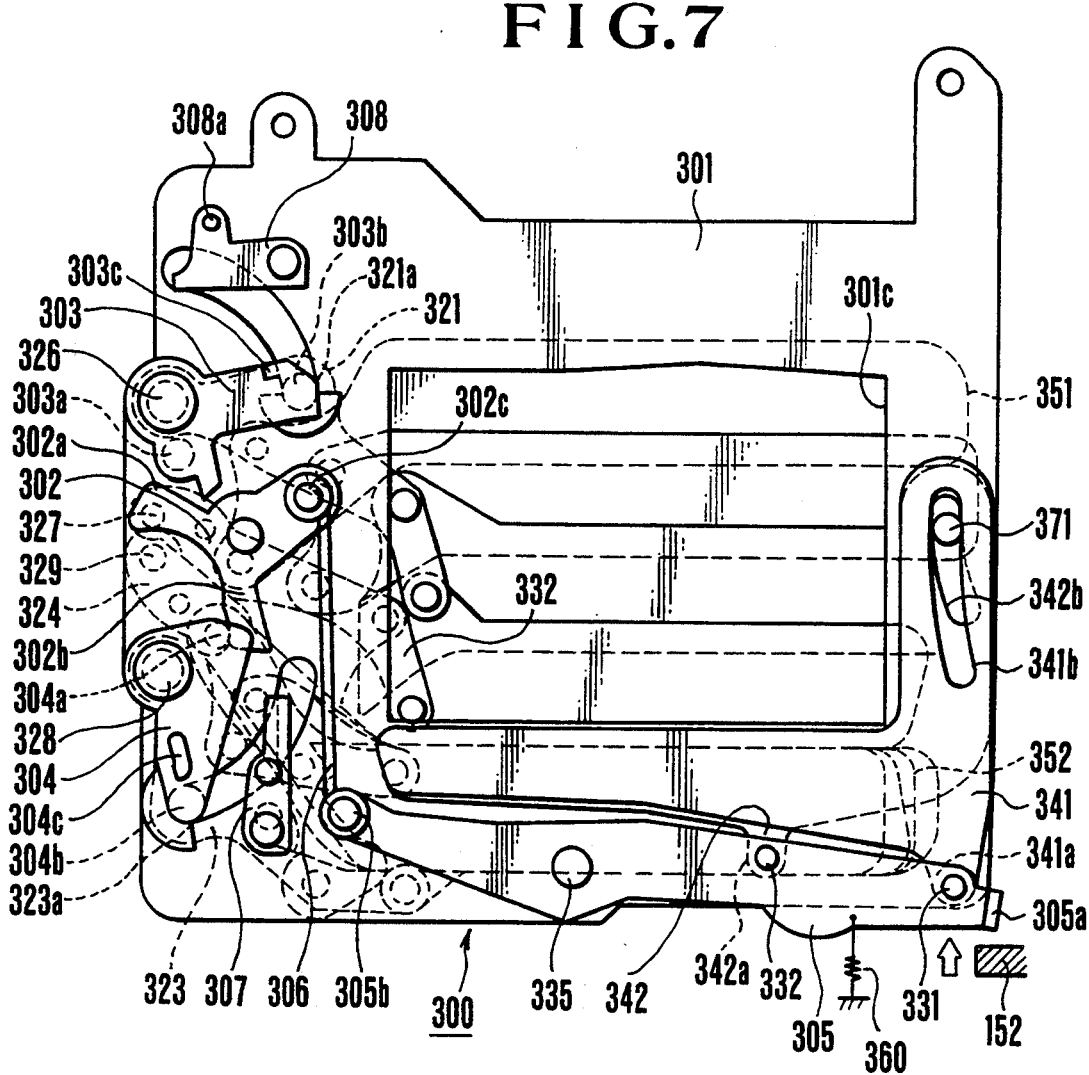
FIG. 7 shows the first embodiment having the shutter in a state before an exposure with the mirror in its up position.

Further, a return cam 142 is arranged on the reverse side of the shutter charging gear 140. A return lever 180 is arranged to be swingable on a rotary shaft 180a. The rotary shaft 180a is rotatably carried by the base plate 101 in one of various conceivable manners, the details of which are, however, omitted from description given herein. In the case of FIG. 2, an action pin 180c on the return lever 180 is in a state of abutting on one end 305a of the seesaw lever 305. However, an abutting part 180b of the lever 180 is not abutting on the return cam 142 and no force is acting on the return lever 180 in the state shown in FIG. 2. When the shutter charging gear 140 begins to rotate counterclockwise after commencement of a mirror-up action, the return cam 142 begins to abut on the abutting part 180b of the return lever 180. Then, the return lever 180 begins to turn clockwise. The clockwise turn of the return lever 180 causes the action pin 180c to forcibly push the end part 305a of the seesaw lever 305 downward. It goes without saying that the escape of the roller 152 which is restricted by the roller 151 of the shutter charging lever 150 and the downward cam face 141c is arranged to be effected before the downward forcible pushing action on the end part 305a. Since the seesaw lever 305 is pushed down by the driving force of the motor M1 during this process, a return spring 360 which is provided for the seesaw lever 305 can be allowed to have a weak spring force. A method for setting the spring force of the return spring 360 will be described later with reference to FIGS. 6 and 7. When the process of the mirror-up action reaches a mirror-up stopping state as shown in FIG. 3, the upper dead point 142a of the return cam 142 comes to be in a state of abutting on the abutting part 180b of the return lever 180. Under this condition, the seesaw lever 305 is returned by the force of the return spring 360 to an end position as shown in FIG. 7. A stopper 190 which is arranged to restrict the turning movement of the return lever 180 is secured to the base plate 101.

As will be readily appreciated by comparing FIGS. 2 and 3, the mirror-up driving phase of the mirror driving lever 130 obtained by the mirror driving cam 121 is arranged to completely deviate from the charging driving phase of the seesaw lever 305 obtained by the shutter charging cam 141. In other words, as shown in FIG. 2, the mirror driving cam 121 does not push the mirror driving lever 130 when the seesaw lever 305 is pushed for charging by the shutter charging cam 141. In this instance, the movable mirror 70 is in a down position (a viewfinder sighting position) as shown in FIG. 2. When the movable mirror 70 is brought into an up position (a retracted position for an exposure) with the mirror driving lever 130 pushed by the mirror driving cam 121, the shutter charge cam 141 does not push the seesaw lever 305 to have the shutter unit 300 in a charging-cancelling state, as shown in FIG. 3. In that instance, the mechanical holding of the leading and trailing shutter curtains (or blades) in the travel-ready positions is cancelled.

A signal circuit board 160 is secured to the base plate 101 with screws. Three position detecting patterns are formed on the signal circuit board 160 by printing, vapor deposition or the like. These patterns include a ground pattern 161, an action-end detecting pattern 162 and an overrun detecting pattern 163. The relation of these patterns 161, 162 and 163 to the brush 122 which is secured to the reverse side of the mirror driving gear 120 is as described below with reference to FIGS. 4 and 5.

The brush 122 includes a sliding part 122a which is divided in a comb-like shape for enhancing the safety of contact with the patterns 161 to 163 formed on the signal circuit board 160. Further, the actual sliding position, i.e., the contact point, of the sliding part 122a is in a position 122b on a line which deviates a little inward from the fore end of the brush 122.

Figure 4:
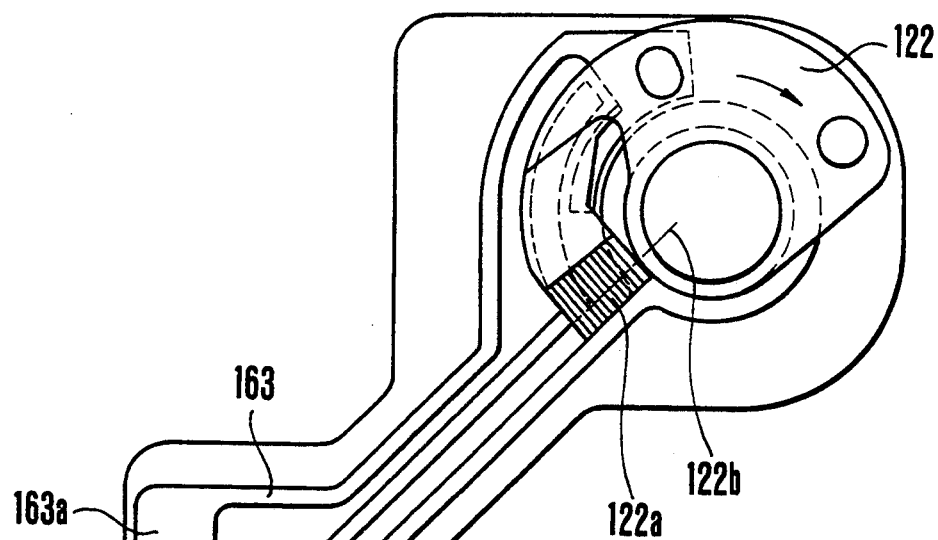
FIG. 4 shows the first embodiment in a signal detecting state with the mirror in its down position.

FIG. 4 shows the brush 122 in a phase of detecting the completion of a shutter charging process and corresponds to FIG. 2. The brush 122 rotates clockwise as indicated by an arrow according to the clockwise rotation of the mirror driving gear 120. In the state shown in FIG. 4, the sliding part 122a is in contact with both the ground pattern 161 and the action-end detecting pattern 162. Under this condition, the completion of the shutter charging process is detected when the potential of the connector (a land part) 162a of the detecting pattern 162 changes to a ground level. A more detailed description of this detection is as follows. A ground level signal formed by a camera control circuit which will be described later herein is supplied to the connector part (land part) 161a of the ground pattern 161. Meanwhile, the output of the connector part 162a of the action-end detecting pattern 162 is supplied to an input port P11 of the camera control circuit. When the brush 122 is in a position before its position shown in FIG. 4 (a position located farther in the counterclockwise direction than the position shown in FIG. 4), the sliding part 122a of the brush 122 is in contact only with the ground pattern 161 and the detecting pattern 162 has not been changed to the ground level as yet. When the brush 122 rotates clockwise and reaches the position shown in FIG. 4 with the mirror driving gear 120 further rotated clockwise, the brush 122 (made of a conductive material) comes into contact also with the action-end detecting pattern 162. Then, the potential of the action-end detecting pattern 162 changes to the ground level through the brush 122. This change enables the camera control circuit to detect the completion of the shutter charging process. The camera control circuit then performs control to bring the rotation of the first motor M1 to a stop. Further, the position of the brush 122 shown in FIG. 4 differs from the position of the brush 122 shown in FIG. 2, because: The first motor M1 is controlled to bring it to a stop (braking) when the brush 122 is in the position of FIG. 4. However, the first motor M1 overruns to some extent as the motor M1 cannot be instantaneously brought to a stop. FIG. 2 shows the position of the brush 122 as having resulted from the overrun of the first motor M1. In FIG. 2, the stopping position of the mirror driving gear 120 (the brush 122) is shown, for the sake of illustration, as obtained when the computed value of the above-stated overrun reaches a maximum value. In actuality, the mirror driving gear 120 can be stopped with less overrun. Further, as shown in FIG. 2, the shutter charging cam 141 includes a flat cam face 141b which is formed for the purpose of allowing the shutter charging completed state to continue in anticipation of the overrun of the first motor M1. The problem of overrun is thus solved by the provision of the flat cam face 141b.

Figure 5:
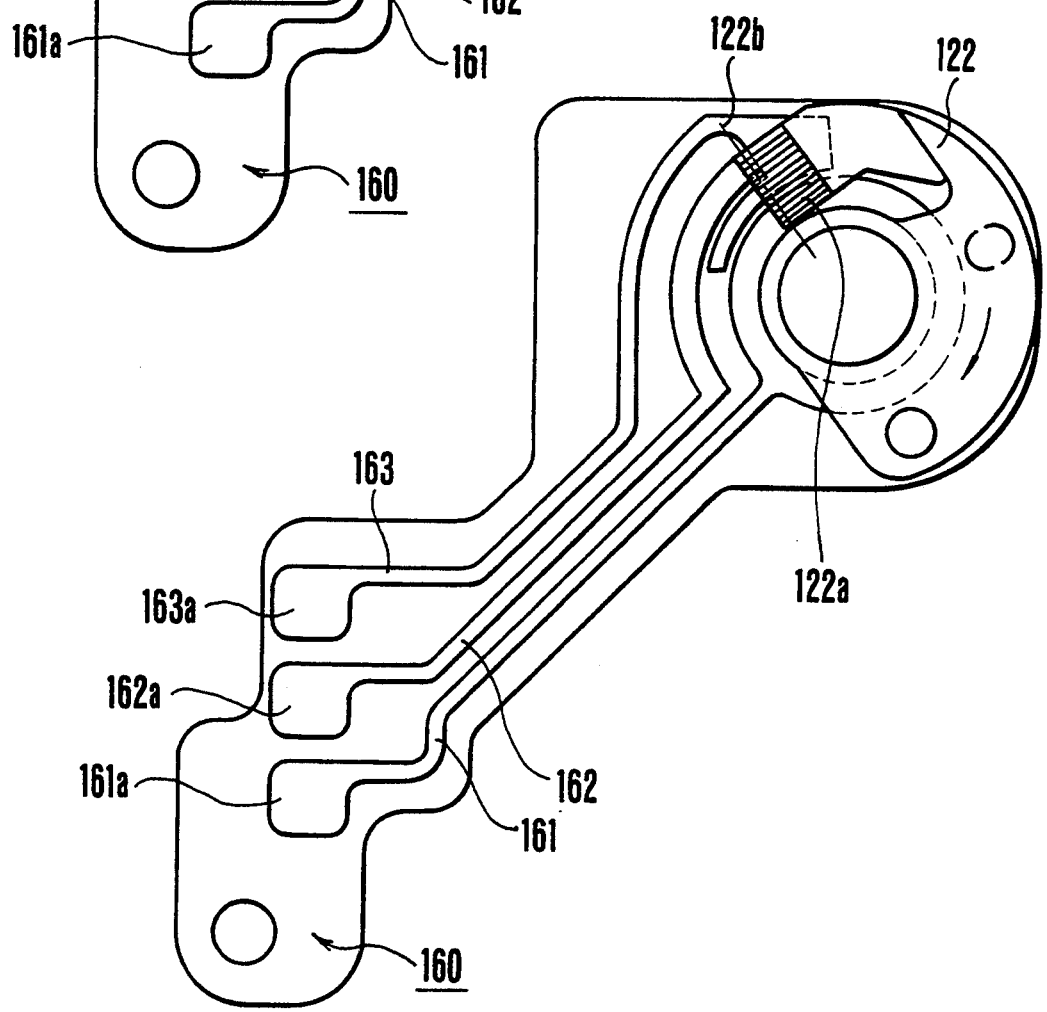
FIG. 5 shows the first embodiment in a signal detecting state with the mirror in its up position.

FIG. 5 corresponds to FIG. 3 and shows the relation of the brush to the patterns as in a phase obtained when the completion of the mirror-up process is detected. Referring to FIG. 5, the brush 122 rotates clockwise following the mirror driving gear 120 from the position shown in FIG. 4 as indicated by an arrow. In the state of FIG. 5, the position of the sliding part 122a has changed from the state of being in contact with both the ground pattern 161 and the action-end detecting pattern 162 to a state of being no longer in contact with the action-end detecting pattern 162. Completion of the mirror-up process is detected by detecting a change in the potential of the connector part (land part) 162a of the detecting pattern 162 from the ground level to the initial level (normal high level) thereof. More specifically, when the brush 122 is in a position before the position of FIG. 5 (i.e., deviating from the latter position in the counterclockwise direction), the sliding part 122a of the brush 122 is in contact with both the ground pattern 161 and the action-end detecting pattern 162 and the output of the connector part 162a of the action-end detecting pattern 162 is still supplying a ground level signal to the camera control circuit. When the mirror driving gear 120 rotates further clockwise from that position to bring the brush 122 to the position of FIG. 5, the brush 122 comes into the state of being no longer in contact with the action-end detecting pattern 162. The potential of the action-end detecting pattern 162 then changes from the ground level to the initial level. The camera control circuit detects the completion of the mirror-up process and causes the first motor M1 to stop from rotating. Further, the position of the brush 122 as shown in FIG. 5 differs from the position of the brush 122 shown in FIG. 3, because the first motor M1 overruns to some extent as it cannot be instantly brought to a stop by braking at the position of FIG. 5. In FIG. 3, the stopped position of the mirror driving gear 120 (the brush 122) is shown as obtained with the amount of overrun of the first motor M1 assumed to be at the maximum computed value for illustration's sake. In actuality, the mirror driving gear 120 can be brought to a stop with less overrun. As shown in FIG. 3, the mirror driving cam 121 includes a flat cam face 121b for allowing the mirror-up state to continue in anticipation of the overrun of the first motor M1, so that the problem of the overrun can be solved.

The relation between the shutter charging action and the mirror-up action is further described from an overall viewpoint as follows: It is important that all the shutter charging action, the mirror-up action, the shutter charging-cancelling action and the mirror-down action are carried out by rotating the first motor M1 in one and the same direction. In other words, all these actions are performed with the planet gear 105 in a state of engaging the transmission gear 106 after having been rotated counterclockwise by the counterclockwise rotation of the first motor M1 (counterclockwise rotation of the output gear 102). The rotating force of the first motor M1 causes the mirror driving gear 120 to rotate clockwise and the shutter charging gear 140 to rotate counterclockwise. When the mirror driving cam 121 of the mirror driving gear 120 is in a position to allow the mirror to be moved downward (FIG. 2), the shutter charging cam 141 of the shutter charging gear 140 is in a position to cause the shutter charging action to be performed (FIG. 2). When the mirror driving cam 121 is in a mirror-up position (FIG. 3), the shutter charging cam 141 is in a shutter charging-cancelling position (FIG. 3). The above-stated actions can be repeated by the counterclockwise rotation of the first motor M1. However, the rotation of the first motor M1 is temporarily brought to a stop by the contact of the brush 122 with each of the patterns 161, 162 and 163 upon completion of the shutter charging action (FIG. 2). After this, the rotation of the motor M1 in the same direction is resumed when a shutter release operation is detected by the camera control circuit. Then, the motor M1 is again temporarily brought to a stop upon completion of the mirror-up action (FIG. 3). After that, the rotation of the motor M1 in the same direction is resumed when completion of the travel of the shutter is detected by the camera control circuit. When the shutter charging action is completed next time (FIG. 2), the motor M1 is again temporarily brought to a stop. The sequence of these processes is thus repeated. Further, the overrun detecting pattern 163 is provided for detecting that the overrun of the first motor M1 comes to exceed a given value when the motor M1 is brought to a stop. In a case where the potential of this pattern 163 changes, that is, when the potential of the overrun detecting pattern 163 changes, for example, from its initial level to the ground level at the time of completion of the shutter charging action as shown in FIG. 4, or where the potential of the overrun detecting pattern 163 changes from the ground level to the initial level at the time of completion of the mirror-up action, the amount of the overrun is determined to be exceeding the given value.

The structural arrangement of the movable mirror 70 which is rotatably carried by the mirror box 60 is described as follows: The movable mirror 70 is formed with a reflection mirror 71 secured to a supporting frame 72. Rotating shafts 73 are formed at the ends of two sides of the supporting frame 72 and arranged to rotatably carry the mirror 70 within the mirror box 60. A mirror pin 74 is formed on one side of the supporting frame 72 in such a way as to engage the mirror driving lever 130. A spring 75 is arranged to exert a spring force to constantly urge the supporting frame 72 to move counterclockwise (in the direction of moving the mirror downward. When the mirror driving lever 130 comes to a position to allow the mirror to be moved downward (FIG. 2), the movable mirror 70 is turned counterclockwise by the urging force of the spring 75 and is thus brought back to its down position (or a viewfinder sighting position).

Next, the structural arrangement of the shutter unit 300 which is mounted on the mirror box 60 is described with reference to FIGS. 6 and 7 as follows: The shutter unit 300 of this embodiment is arranged as described in U.S. Pat. No. 4,864,336 cited in the foregoing. FIG. 6 shows the shutter unit 300 in a state obtained after completion of the shutter charging action. FIG. 7 shows the shutter unit 300 in a state of having allowed the two curtains (blades) of the shutter to travel after cancelling the charging of the shutter.

In these figures, a reference numeral 301 denotes a shutter base plate which forms the above-stated supporting frame and includes an exposing aperture 301c. A charging lever 302 is arranged within the shutter unit 300 to charge a trailing blade driving lever 303 and a leading blade driving lever 304 (hereinafter referred to simply as driving levers). These members jointly form shutter driving means. The trailing blade driving lever 303 is arranged to cause a trailing blade group 351 to travel. The leading blade driving lever 304 is arranged to cause a leading blade group 352 to travel.

A seesaw lever 305 is arranged to charge up the shutter unit and is pivotally carried by a rotation shaft 335 erected on the shutter base plate 301. One end 305a of the seesaw lever 305 engages the roller 152 of the shutter charging lever 150 which is included in the shutter charging mechanism shown in FIG. 2. When this end 305a of the seesaw lever 305 receives a rotating force from the roller 152 in the direction of arrow shown in FIG. 7, the other end 305b of the seesaw lever 305 turns counterclockwise as viewed on FIG. 7. Then, through a link lever 306 which is connected to the other end 305b, the leg 302c of the charging lever 302 is turned clockwise. As a result, the state shown in FIG. 7 shifts to the state shown in FIG. 6 and the process of the shutter charging action comes to an end.

Leading and trailing clamp levers 307 and 308 are arranged to prevent the driving levers 304 and 303 which have been charged by the charging lever 302 from turning until a shutter travel signal is sent from the camera control circuit. Trailing blade travel arms 321 and 322 are arranged to hold the trailing blade group 351 in the form of a parallel link and to cause the trailing blade group 351 to travel by rotating respectively on rotation shafts 326 and 327. Leading blade travel arms 323 and 324 are arranged to hold the leading blade group 352 in the form of a parallel link and to cause the leading blade group 352 to travel by rotating respectively on rotation shafts 328 and 329.

In addition to the arrangement described, this embodiment is provided with a light blocking device. The light blocking device includes a pair of light blocking blades 341 and 342 which are arranged to be moved upward from their retracted positions shown in FIG. 7 to their light blocking positions as shown in FIG. 6 in association with the turning motion of the seesaw lever 305 made for the purpose of charging up the shutter unit.

In the case of this embodiment, the two light blocking blades which are in an L shape are arranged to move up and down while being guided by pins which are arranged on the shutter base plate 301 to engage slots formed in the rising parts of the L shapes of the light blocking blades 341 and 342. Further, for the upward and downward movement to be made in association with the seesaw lever 305, the leg parts 341a and 342a of the light blocking blades 341 and 342 are connected to the seesaw lever 305 respectively through shafts 331 and 332.

For guiding the light blocking blades as mentioned above, a guide pin 371 which is erected on the shutter base plate 301 is inserted into slots 341b and 342b which are formed in the rising parts 341c and 342c of the L shapes of the light blocking blades 341 and 342 and extend approximately in the vertical direction.

With the light blocking blades 341 and 342 arranged in the above-stated manner, the counterclockwise turn of the seesaw lever 305 causes these blades 341 and 342 to move upward from their positions of FIG. 7 to the positions of FIG. 6 while retaining their illustrated postures by virtue of the guide arrangement. Then, the clockwise turn of the seesaw lever 305 causes the light blocking blades 341 and 342 to move downward from their positions of FIG. 6 to the positions of FIG. 7. The connecting positions at which the light blocking blades 341 and 342 are connected respectively to the rotation shafts 331 and 332 of the seesaw lever 305 differ a given distance from each other. This difference in connected position between them causes the light blocking blades to have different ascending and descending strokes. The difference in the ascending and descending strokes is arranged in such a way as to reduce the stowed volume of them in their retracted positions by overlapping them and also to effectively cover a given light shielding range by spreading them in their light blocking positions.

A spring member 360 is arranged to constantly exert a spring force to urge the seesaw lever 305 to move clockwise in the direction of canceling the charging action. The spring force of the spring member 360 is determined on the basis of the following factors: In the case of the conventional camera (disclosed in U.S. Pat. No. 4,864,336), in returning the shutter unit from the state of FIG. 6 to the state of FIG. 7, the returning action must be ensured solely by the force of the spring member 360 after the roller 152 is retracted. However, an extremely great force is necessary in causing the seesaw lever 305 to turn clockwise because of a great friction loss resulting from that the charging lever 302 is directly receiving the spring forces of springs provided for causing the leading and trailing blades to travel as the charging lever 302 abuts on the pins 303a and 304a of the driving levers 303 and 304 approximately at its upper dead points 302e and 302d, in the charging state shown in FIG. 6. When the approximate upper dead points 302e and 302d come out of contact with the pins 303a and 304a, a component force causing the charging lever 302 to turn counterclockwise increases. As a result of the increase, a force necessary for turning the seesaw lever 305 clockwise extremely decreases. When the driving levers 304 and 303 are prevented from turning respectively by the leading clamp lever 307 and the trailing clamp lever 308 with the charging lever 302 turned to an overcharging extent, the pins 303a and 304b cease to abut on the charging lever 302 any longer. The approximate upper dead points 302e and 302d are provided for the purpose of facilitating interface control by allowing an error caused by the roller 152 in the charging amount of the seesaw lever 305. The provision of the upper dead points 302e and 302d thus greatly contributes to quality stabilization. As apparent from the above description, an arrangement to turn the seesaw lever 305 clockwise from its position shown in FIG. 6 requires an extremely large force in the initial stage. After that, the seesaw lever 305 can be turned with an extremely small force. In other words, according to the conventional arrangement, the spring member 360 must be arranged to have an extremely large force. Such arrangement not only results in a great impact sound and great vibrations but also causes a great energy loss because of an increase in the driving torque required in charging the shutter unit with the above-stated motor M1. Further, to increase the traveling speed of the shutter blades, the above-stated springs for causing the leading and trailing blades to travel must be arranged to have a strong spring force. The strong spring force has necessitated a further increase in the force of the spring member 360. Whereas, in the case of this embodiment, the extremely large force required within an initial range of return for the action of the return lever 180 mentioned in the foregoing is guaranteed by the driving force of the motor M1. Therefore, the spring member 360 is allowed to have only a weak spring force sufficient for holding the state shown in FIG. 7. The embodiment is thus arranged to operate quietly and also with enhanced efficiency in terms of energy.

Figure 8:
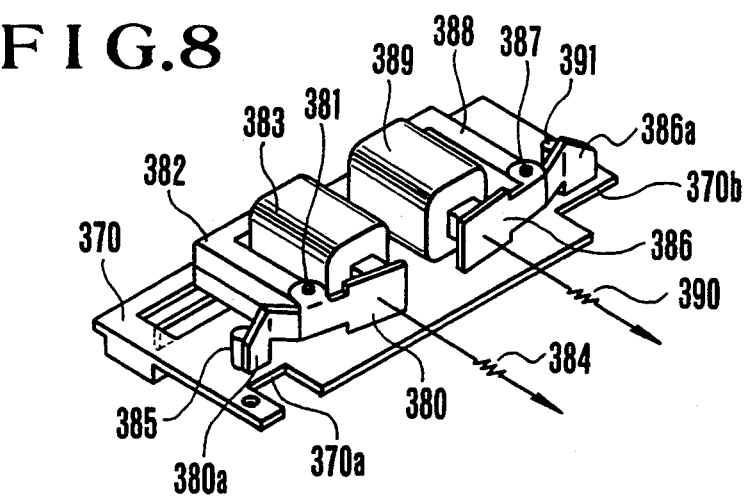
FIG. 8 shows a magnet arrangement for controlling the shutter of the first embodiment.

FIG. 8 shows an unclamping arrangement, which is arranged in a manner as disclosed in U.S. Pat. No. 4,364,654. Referring to FIG. 8, a base plate 370 carries the unclamping arrangement which operates by controlling electromagnets. The base plate 370 is mounted on the shutter base plate 301 of FIGS. 6 and 7. Armature levers 380 and 386 are provided respectively for the leading and trailing blades. The armature levers 380 and 386 are connected respectively to yokes 382 and 388 via shafts 381 and 387, which are arranged to rotatably carry these levers 380 and 386. Springs 384 and 390 urge the armature levers 380 and 386 to move clockwise and counterclockwise, respectively. Stopper pins 385 and 391 are arranged on the base plate 370 to restrict the initial turning movement positions of the armature levers 380 and 386. At a position obtained by turning counterclockwise to a given distance from the initial turning movement position shown in FIG. 8, one end part 380a of the armature lever 380 abuts on the pin 307a of the leading clamp lever 307 to cancel the clamping state of the leading clamp lever 307. Further, at a position obtained by turning clockwise to a given distance from the initial turning movement position shown in FIG. 8, one end part 386a of the armature lever 386 abuts on the pin 308a of the trailing clamp lever 308 so that the clamping state of the trailing clamp lever 308 can be canceled. Coils 383 and 389 are arranged to suck, or pull, and turn the armature levers 380 and 386 against the forces of the springs 384 and 390 when they are energized with currents. The base plate 370 is provided with a cutout part 370a which is arranged to make the pin 307a of the leading clamp lever 307 abut thereon in the shutter charging state shown in FIG. 6. The leading clamp lever 307 is arranged to be urged by a weak spring to move counterclockwise in such a way as to make its pin 307a abut on the inner edge of the cutout part 370a, although this spring is not shown in FIGS. 6 and 7 to avoid complication of illustration. The base plate 370 is further provided with another cutout part 370b which is arranged to make the pin 308a of the trailing clamp lever 308 abut thereon in the shutter charging state shown in FIG. 6. Another weak spring is arranged to urge the trailing clamp lever 308 to move clockwise in such a way as to make its pin 308a abut on the inner edge of the cutout part 370b, although that spring is not shown in FIGS. 6 and 7 to avoid complication of illustration. Further, in FIG. 1, a reference numeral 392 denotes a cover which is arranged to serve as a dustproof cover and also as an electromagnetic shield.

The shutter unit which is arranged as described above operates as described below:

Upon completion of the travel of the shutter after completion of a series of photographing processes, the state of the shutter unit becomes as shown in FIG. 7. Following this, a charging action is immediately performed for a next shot. This charging action is performed by driving the shutter charging lever 150 shown in FIGS. 1 and 2 to turn counterclockwise.

During the process of the charging action, an operating force in the direction of arrow shown in FIG. 7 is applied from the roller 152 of the shutter charging lever 150 to the fore end 305a of the seesaw lever 305. Then, a clockwise turning motion (as viewed on FIG. 7) is imparted to the charging lever 302 via the link lever 306 which engages the shaft 305b at the other end of the seesaw lever 305 and the shaft 302c erected on the charging lever 302. Then, the leg parts 302a and 302b of the charging lever 302 abut respectively on the roller parts 303a and 304a of the driving levers 303 and 304 to cause the driving levers 303 and 304 to turn accordingly as the charging lever 302 turns.

With the driving levers 303 and 304 thus caused to turn, the driving levers 303 and 304 respectively cause the trailing blade travel arm 321 and the leading blade travel arm 323 which respectively engage the shafts 303b and 304b of the levers 303 and 304 at their hole parts 321a and 323a to turn. The trailing blade group 351 and the leading blade group 352 which are linked with these arms are then caused to move upward as viewed on the drawing.

With the shutter charging process progressed in this manner, when the protruding parts 303c and 304c of the driving levers 303 and 304 reach a position where they can engage the fore ends of the above-stated clamp levers 307 and 308, the shutter charging process comes to an end and the shutter unit assumes a standby state for a next shutter release operation as shown in FIG. 6.

While the seesaw lever 305 is being charged, the light blocking blades 341 and 342 which are rotatably attached respectively to the rotation shafts 331 and 332 disposed on the seesaw lever 305 are moved upward as viewed on the drawing. Then, since these light blocking blades 341 and 342 engage the guide pin 371 through the guide slots 341b and 342b formed respectively in these blades, the guide pin 371 restricts the postures of these light blocking blades 341 and 342 to approximately horizontal postures as viewed on the drawing during their ascent. Upon completion of the charging process, these light blocking blades 341 and 342 cover a lower part of an exposing aperture 301 formed in the shutter base plate 301 in their positions as shown in FIG. 6.

With the charging process completed in a state as shown in FIG. 6, the shutter unit remains in this state until the shutter release action is performed the next time.

The shutter release action is described as follows: When a shutter release button which is not shown is pushed, the mirror-up action is performed as described in the foregoing with reference to FIG. 2. At the same time, the shutter charging lever 150, and roller 152, are withdrawn from the position shown in FIG. 6 to the position shown in FIG. 7. Following this, the seesaw lever 305 is caused by the spring member 360 to turn clockwise as viewed on the drawing. The clockwise turn of the seesaw lever 305 causes the charging lever 302 which is linked with the seesaw lever 305 to turn counterclockwise. These levers then change their positions from the positions shown in FIG. 6 to the positions shown in FIG. 7. In this instance, the return lever 180 which is described in the foregoing with reference to FIGS. 1 to 3 acts to ensure that the seesaw lever 305 comes back to its initial position without fail.

The above-stated turn of the seesaw lever 305 causes the light blocking blades 341 and 342 which are rotatably attached to the seesaw lever 305 to descend retaining their approximately horizontal postures under the restriction imposed by the guide pin 371 through their guide slots 341b and 342b. The positions of the light blocking blades 341 and 342 change from the positions of FIG. 6 to the positions of FIG. 7 and thus move outside of the exposing aperture 301c provided in the shutter base plate 301.

After completion of these processes, the camera control circuit detects the completion of the mirror-up process by detecting the change of the potential of the mirror-up (action-end) detecting pattern 162 from the ground level to the initial level. The camera control circuit first causes a current to be applied to the coil 383 of FIG. 8. The coil 383 is energized to turn the armature lever 380 counterclockwise against the force of the spring 384 as the lever 380 is pulled to the sucking face of the yoke 382. The turn of the armature lever 380 causes its one end part 380a to push the pin 307a to turn the leading clamp lever 307 clockwise. The clockwise turn of the leading clamp lever 307 disengages it from the protruding part 304c of the leading blade driving lever 304. The driving lever 304 is allowed to turn clockwise. The leading blade travel arm 323 is then also turned clockwise. The leading blade group 352 travels (downward as viewed on the drawing) to initiate an exposure. Then, according to a given shutter time, the camera control circuit causes a current to be applied to the coil 389. The armature lever 386 is pulled to the sucking face of the yoke 388 and turned clockwise against the force of the spring 390. The turn of the armature lever 386 causes its one end part 386a to push the pin 308a of the trailing clamp lever 308. The clamp lever 308 is thus caused to turn clockwise to disengage the protruding part 303c of the trailing blade driving lever 303. The driving lever 303 turns clockwise. The trailing blades travel arm 321 also turns clockwise. The trailing blade group 351 then travels (downward as viewed on the drawing) to terminate the exposure.

The foregoing description covers the mirror-box driving mechanism 100 and the shutter unit 300 which are arranged together with the mirror box 60.

Figure 9:
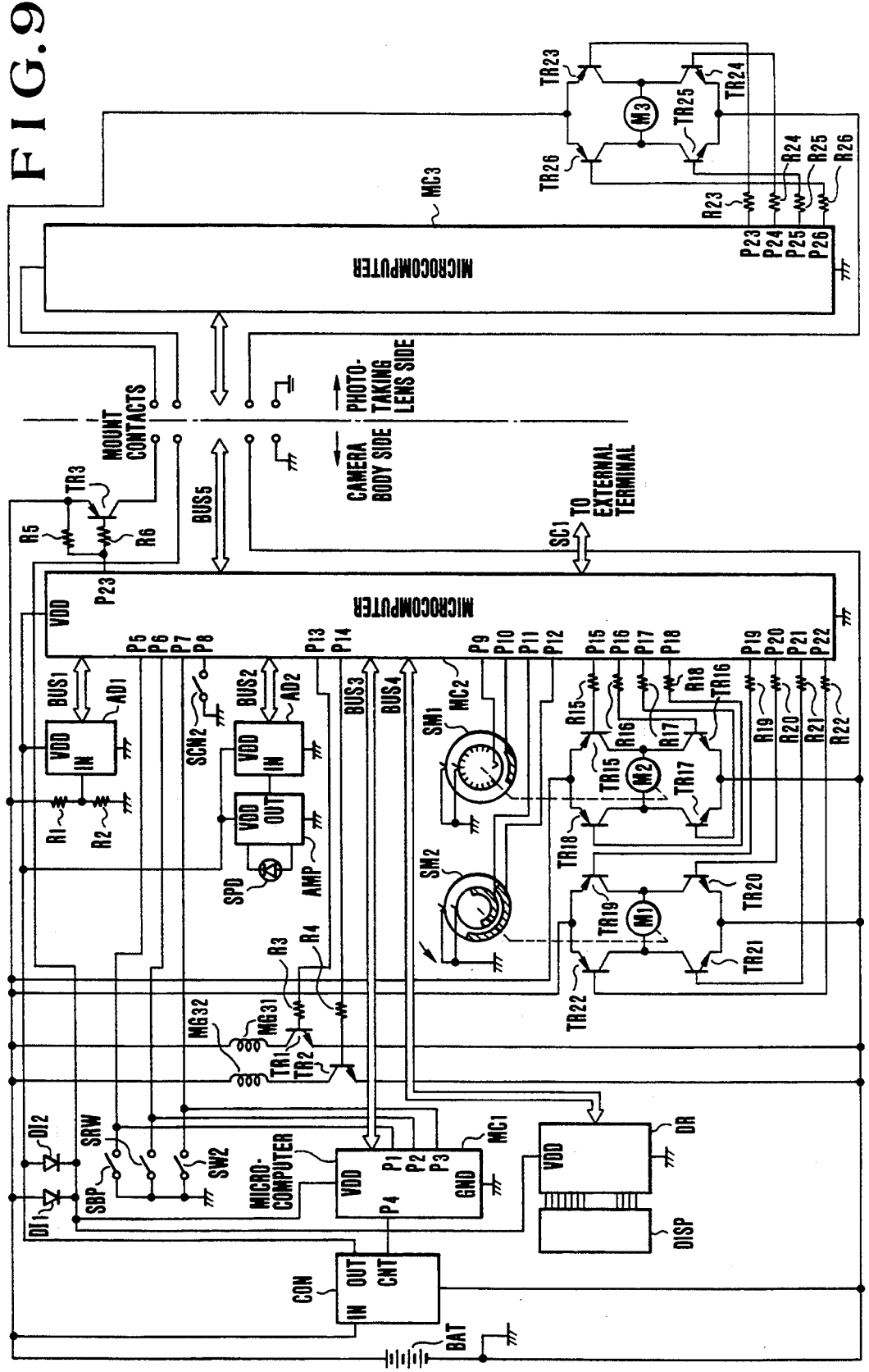
FIG. 9 is a circuit diagram showing the control circuit of the first embodiment.

FIG. 9 is a circuit diagram showing the whole arrangement of the camera control circuit. In FIG. 9, a reference symbol BAT denotes a power source battery. A symbol CON denotes a DC/DC converter. A symbol MC1 denotes a microcomputer. The DC/DC converter CON is arranged to have an unstable voltage which ranges from 4 to 6 volts supplied from the power source battery BAT to the input terminal IN of the converter CON. The DC/DC converter CON converts the unstable voltage into a stable voltage of 5 volts and outputs the stable voltage from its output terminal OUT. However, the DC/DC converter CON is arranged such that the voltage of 5 volts is outputted when a high level signal is inputted to its control input terminal CNT and a voltage of 0 volt is outputted when a low level signal is inputted. The DC/DC converter CON has its control input terminal CNT connected to an output terminal P4 of the microcomputer MC1 and thus operates under the control of the microcomputer MC1.

A reference symbol MC2 denotes a microcomputer which includes an E²PROM (nonvolatile memory) and is capable of performing high speed arithmetic operations. A symbol AD1 denotes an A/D converter. Symbols R1 and R2 denote resistors. A symbol BUS1 denotes a bus line for communication between the microcomputer MC2 and the A/D converter AD1. The resistors R1 and R2 are connected in series in such a way as to divide the voltage of the power source battery BAT. The voltage obtained through these resistors is supplied to the input terminal IN of the A/D converter AD1. The A/D converter AD1 then A/D-converts this voltage and sends a converted value thus obtained to the microcomputer MC2 through the bus line BUS1.

A silicon photodiode SPD is provided for measuring the luminance of the external light (the light of a photographing object coming through the photo-taking lens). An amplifier AMP is arranged to amplify the output of the silicon photodiode SPD for temperature compensation. An A/D converter AD2 is arranged to A/D-convert the output of the amplifier AMP. The output terminal OUT of the amplifier AMP is connected to the input terminal IN of the A/D converter AD2. A bus line BUS2 is provided for communication between the A/D converter AD2 and the microcomputer MC2. The A/D converter AD2 is thus arranged to send a measured light value to the microcomputer MC2 through the bus line BUS2. The A/D converters AD1 and AD2, the amplifier AMP and the microcomputer MC2 operate by receiving the stable voltage of 5 V outputted from the DC/DC converter CON. Therefore, the circuit is inoperative when the voltage converting action of the DC/DC converter CON is not performed.

A switch SBP is arranged to operate in response to the movement of the back lid of the camera. The switch SBP turns off, on the circuit, when the back lid is closed and turns on when the back lid is opened. A switch SRW is arranged to operate in response to a film rewinding button which is not shown but is arranged to be used for rewinding the film. The switch SRW is normally in an off-state and turns on when the film rewinding button is pushed. A switch SW2 is interlocked with a shutter release button which is not shown. The switch SW2 is normally in an off-state and turns on when the release button is pushed. A switch SCN2 is interlocked with the trailing shutter curtain (blades) of the camera and is arranged to turn on when the travel of the trailing shutter curtain comes to an end.

These switches SBP, SRW and SW2 are connected respectively to the input ports P1, P2 and P3 of the microcomputer MC1 and the input ports P5, P6 and P7 of the microcomputer MC2. Each of the microcomputers MC1 and MC2 is thus enabled to independently detect the on- or off-states of these switches. Meanwhile, the switch SCN2 is connected to the input port P8 of the microcomputer MC2 to enable only the microcomputer MC2 to detect the on- or off-state of the switch SCN2.

A bus line BUS3 is provided for communication between the microcomputers MC1 and MC2. A display device DISP is arranged to display the shutter time and aperture values obtained through a light measuring action and an arithmetic operation and the operating state of the camera by means of, for example, a liquid crystal arrangement. A display driving integrated circuit (hereinafter referred to as IC) DR is connected to the the display device DISP and arranged to drive the latter to make a display. The display driving IC DR is connected to the microcomputer MC2 through a bus line BUS 4 and is thus arranged to receive display information (or data) from the microcomputer MC2. Upon receipt of the display data, the display driving IC DR drives the display device DISP on the basis of the data.

The microcomputer MC1 and the display driving IC DR receive power supply respectively through diodes DI1 and DI2 either from the power source battery BAT or from the DC/DC converter CON. Therefore, the circuit action is continuously performed as long as the power source battery BAT is mounted on the camera.

A reference symbol MG31 denotes the coil of an electromagnet arrangement which is arranged to start the leading shutter curtain (blades) and corresponds to the coil 383 of FIG. 8. A symbol MG32 denotes the coil of another electromagnet arrangement which is arranged to start the trailing shutter curtain (blades) and corresponds to the coil 389 of FIG. 8.

The coil MG31 is connected to the collector of a transistor TR1 and the coil MG32 to the collector of a transistor TR2. The base of the transistor TR1 is connected to the output port P13 of the microcomputer MC2 via a base resistor R3. The base of the transistor TR2 is connected to the output port P14 of the microcomputer MC2 via a base resistor R4. The shutter time is thus controlled by signal outputs from the output ports P13 and P14 of the microcomputer MC2.

Further, the coils MG31 and MG32 are arranged to be used also as actual load resistance when a voltage check is made with the shutter locked to prevent it from traveling. This control can be performed by the microcomputer MC2 by means of the signal outputs from its output ports P13 and P14.

A second motor M2 is arranged for film winding. The second motor M2 has one of its two terminals connected to the collector of a PNP transistor TR15 and that of an NPN transistor TR16. To the other terminal of the second motor M2 are connected the collector of a PNP transistor TR18 and that of an NPN transistor TR17. The bases of the transistors TR15, TR16, TR17 and TR18 are connected to the output ports P15, P16, P17 and P18 of the microcomputer MC2, respectively, via resistors R15, R16, R17 and R18.

The emitters of the transistors TR15 and TR18 are connected to the plus side of the power source battery BAT. The emitters of the transistors TR16 and TR17 are connected to the minus side of the power source battery BAT.

The microcomputer MC2 is capable of causing the second motor M2 to rotate forward or backward by outputting signals from the output ports P15, P16, P17 and P18. For example, in order to cause the second motor M2 to make the forward rotation, high-level signals are outputted from the output ports P15 and P16 and low-level signals from the output ports P17 and P18 to turn on the transistors TR16 and TR18 and to turn off the transistors TR15 and TR17. As a result, a current flows from the left to the right to rotate the second motor M2 forward.

In order to cause the second motor M2 to make a reverse (backward) rotation, the microcomputer MC2 outputs low-level signals from the output ports P15 and P16 and high-level signals from the output ports P17 and P18. The transistors TR16 and TR18 are turned off and the transistors TR15 and TR17 are turned on to cause a current flow from the right to the left, so that the second motor M2 can be rotated backward.

A reference symbol M1 denotes the first motor which is arranged for charging the shutter and driving the mirror. One of the two terminals of the first motor M1 is connected to the collector of a PNP transistor TR19 and that of an NPN transistor TR20. The other terminal of the first motor M1 is likewise connected to the collector of a PNP transistor TR22 and that of an NPN transistor TR21. The bases of the transistors TR19, TR20, TR21 and TR22 are connected respectively to the output ports P19, P20, P21 and P22 of the microcomputer MC2 via resistors R19, R20, R21 and R22.

The emitters of the transistors TR19 and TR22 are connected to the plus side of the power source battery BAT and those of the transistor TR20 and TR21 to the minus side of the battery BAT. The microcomputer MC2 is capable of performing control over the first motor M1 to cause it to rotate forward or backward in the same manner as in controlling the second motor M2.

A switch SM1 is composed of a conductive pattern formed on a rotary circuit board. The rotary circuit board switch SM1 rotates in association with the rotation of a sprocket 402 included in the film-winding driving mechanism 400. Signals from the switch SM1 are supplied to the input ports P9 and P10 of the microcomputer MC2. The microcomputer MC2 is thus arranged to be capable of detecting the on- and off-signals of the pattern formed on the rotary circuit board. A switch SM2 is a brush sliding type switch and is arranged to rotate in association with the rotation of a cam which causes the mirror to move upward and downward and also charges the shutter. The switch SM2 corresponds to the switch which is composed of the brush 122 and the signal circuit board 160 shown in FIGS. 2 to 5. Signals from the switch SM2 is arranged to be supplied to the input ports P11 and P12 of the microcomputer MC2, so that on- and off-signals resulting from the one-way rotation of the first motor M1 can be detected by the microcomputer MC2.

A switching transistor TR3 is arranged to be operated through mount contacts (contact type contacts disposed both at the camera mount part of the camera body and the lens mount part of the photo-taking lens) for switch-over between effecting and stopping power supply to a third motor M3, which is arranged to drive a diaphragm disposed on the side of the lens. The base of the transistor TR3 is connected to the output port P23 of the microcomputer MC2 via a base resistor R6. The power supply to the third motor M3 is thus arranged to be controllable by the microcomputer MC2 for driving the diaphragm which is disposed on the side of the lens. A resistor R5 is provided for the purpose of leaving the transistor TR3 in an off-state in a case where the power supply is stopped by the off-state of the DC/DC converter CON caused by the microcomputer MC2. This resistor is disposed between the plus side terminal of the power source battery BAT and the base of the transistor TR3 through the base resistor R6.

A microcomputer MC3 is disposed within the photo-taking lens which is arranged to be mountable on the camera body. The third motor M3 is also arranged within the lens to drive the diaphragm to open or close the blades of the diaphragm within the lens.

One end of the two terminals of the third motor M3 is connected to the collector of a PNP transistor TR23 and that of an NPN transistor TR24. To the other terminal of the motor M3 are connected the collector of a PNP transistor TR26 and that of an NPN transistor TR25. The bases of these transistors TR23, TR24, TR25 and TR26 are connected respectively to the output ports P23, P24, P25 and P26 of the microcomputer MC3 through resistors R23, R24, R25 and R26.

The emitters of the transistors TR23 and TR26 are connected to the plus side of the power source battery BAT via the mount contacts arranged between the camera body and the lens and the switching transistor TR3. The emitters of the transistors TR16 and TR17 are connected to the minus side of the power source battery BAT also via the mount contacts between the camera body and the lens.

The microcomputer MC3 is arranged to be capable of causing the third motor M3 to rotate forward or backward by outputting signals from its output ports P23, P24, P25 and P26.

A bus line BUS5 is arranged for communication between the microcomputer MC2 disposed on the side of the camera body and the microcomputer MC3 disposed on the side of the lens via the above-stated mount contacts. The microcomputer MC2 is arranged to instruct through this bus line BUS5 the microcomputer MC3 to cause the third motor M3 to drive the diaphragm blades to stop the aperture down to a given position or to cause the third motor M3 to drive the diaphragm blades backward to its full open position. The microcomputer MC3 receives the power supply either from the power source battery BAT via the mount contacts or from the DC/DC converter CON via the diodes DI1 and DI2.

A bus line SC1 is arranged for communication between the microcomputer MC2 and an external terminal. The external terminal for this purpose may be arranged either on the outside of the camera body or may be connectable by removing a pentagonal cover of the camera body. This bus line SC1 enables the camera to rewrite the data stored in the E$^2$PROM by communicating with a host computer disposed outside of the camera in such a way as to enable the camera to automatically perform film rewinding or to inhibit automatic film rewinding.

Figure 10:
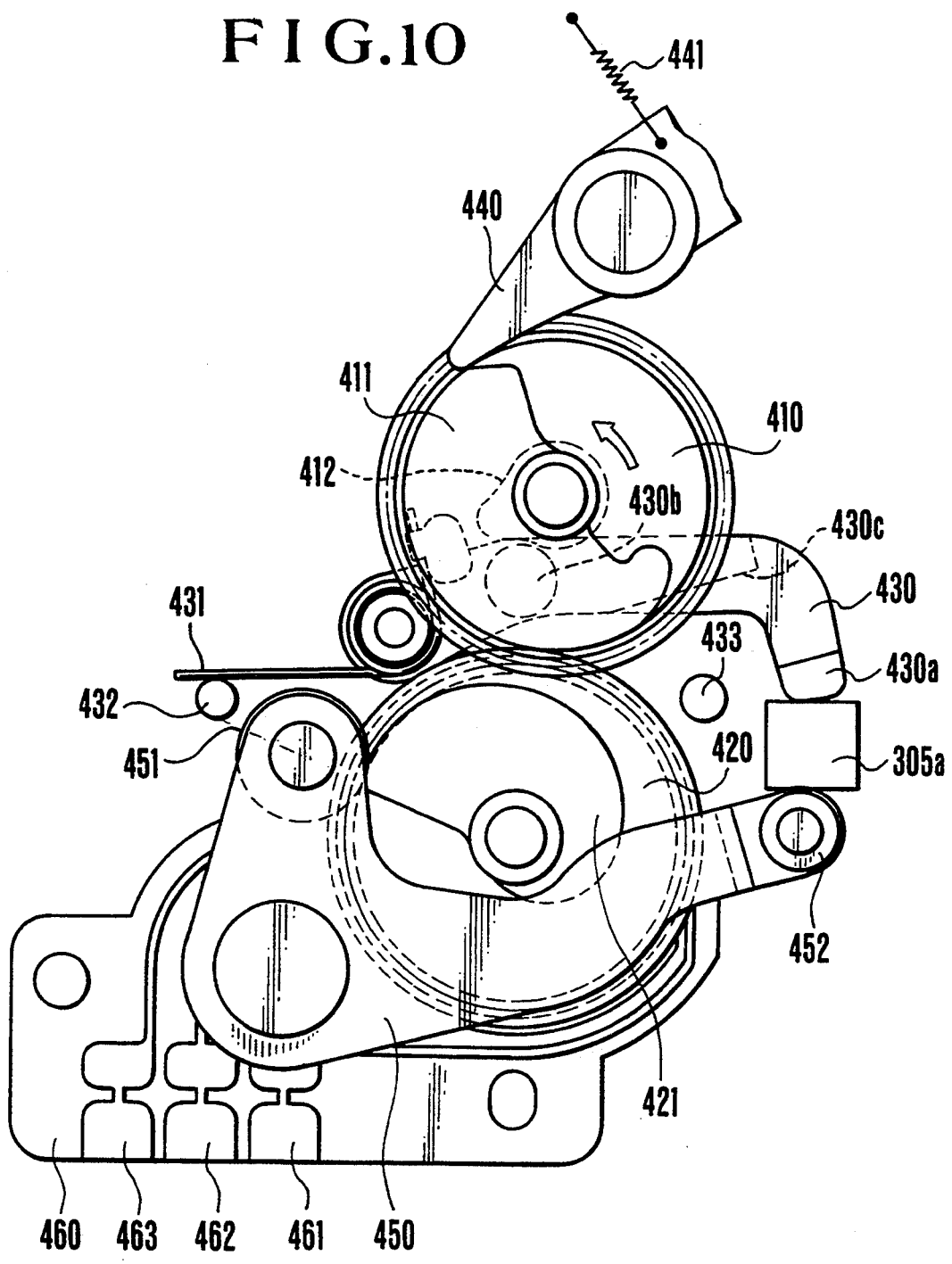
FIG. 10 shows a second embodiment of the invention in a state of having a mirror in a down position.
Figure 11:
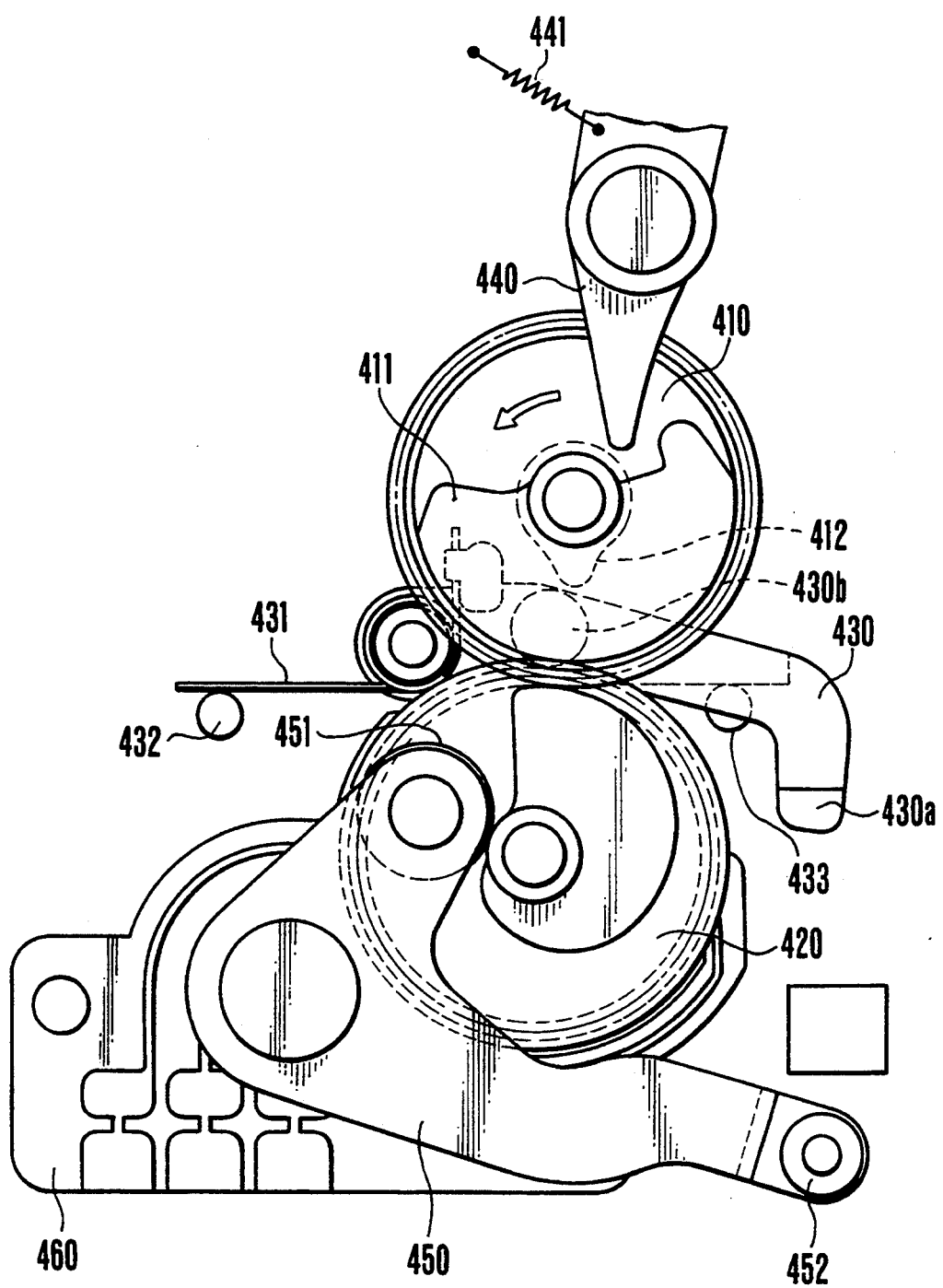
FIG. 11 shows the second embodiment in a state of having the mirror in an up position.

FIGS. 10 and 11 show a second embodiment of this invention and correspond to FIGS. 2 and 3 which show the first embodiment of the invention. The mirror driving gear 120, the shutter charging gear 140 and parts around them are also shown in FIGS. 10 and 11.

FIG. 10 shows the second embodiment in a state of having the mirror in its down position while FIG. 11 shows the embodiment in a state of having the mirror in its up position. Referring to these figures, a mirror driving gear 410 is arranged to rotate only in the counterclockwise direction. A motor which is not shown is arranged to drive the mirror driving gear 410. The driving force of the motor is transmitted in the same manner as in the case of the first embodiment. The transmission means is, therefore, omitted from description. A mirror lever 440 is arranged to store a mirror-up force by being resiliently urged to move counterclockwise by a spring 441. The mirror-up and mirror-down actions are controlled by means of a mirror cam 411. The details of this control are similar to what is disclosed in U.S. patent application Ser. No. 650,866, filed on Feb. 5, 1991, and are therefore omitted from description given herein. A return cam 412 is disposed on the reverse side of the mirror driving gear 410. A return lever 430 is arranged to be urged to move clockwise by a spring 431, which is attached to a fixed spring peg 432. In the case of FIG. 10, the action part 430a of the return lever 430 is arranged to be turned counterclockwise against the force of the spring 431 by the end part 305a of the seesaw lever 305 mentioned in the foregoing. During the process of the turning movement of the mirror driving gear 410 from its position shown in FIG. 10 to its position shown in FIG. 11, the return cam 412 comes to abut on the cam part 430b of the return lever 430 and thus causes the return lever 430 to turn clockwise. A fixed stopper 433 is arranged to restrict the clockwise turn of the return lever 430 by abutting on the stopper part 430c of the latter. A shutter charging gear 420 is arranged to charge the shutter with a shutter charging cam 421 by turning clockwise only. A shutter charging lever 450 is provided with rollers 451 and 452 and is arranged to drive the end part 305a of the seesaw lever 305 by acting on the shutter charging cam 421. A signal circuit board 460 is provided with patterns 461, 462 and 463 and is used for control actions, which are performed by detecting the rotation of the shutter charging gear 420 in a manner similar to the action performed by the first embodiment. Therefore, the details of the control action are omitted from description.

In this embodiment, the return lever 430 is constantly urged to move clockwise by means of the spring 431 which is additionally employed. The addition of the spring 431 prevents the lever from rattling when the camera is shaken. Further, the spring 431 is arranged to act only in the initial stage of the returning movement of the seesaw lever 305. Therefore, the ability of the seesaw lever 305 for following the roller 452 can be improved and a loss of energy can be minimized. The use of the spring 431 gives also the following advantages: A sound which is generated by the collision between the roller 452 and the end part 305a of the seesaw lever 305 can be reduced. The force to be exerted on the return cam 412 also can be reduced, so that mirror-up action can be speedily accomplished to shorten a shutter release lag time.

Figure 12:
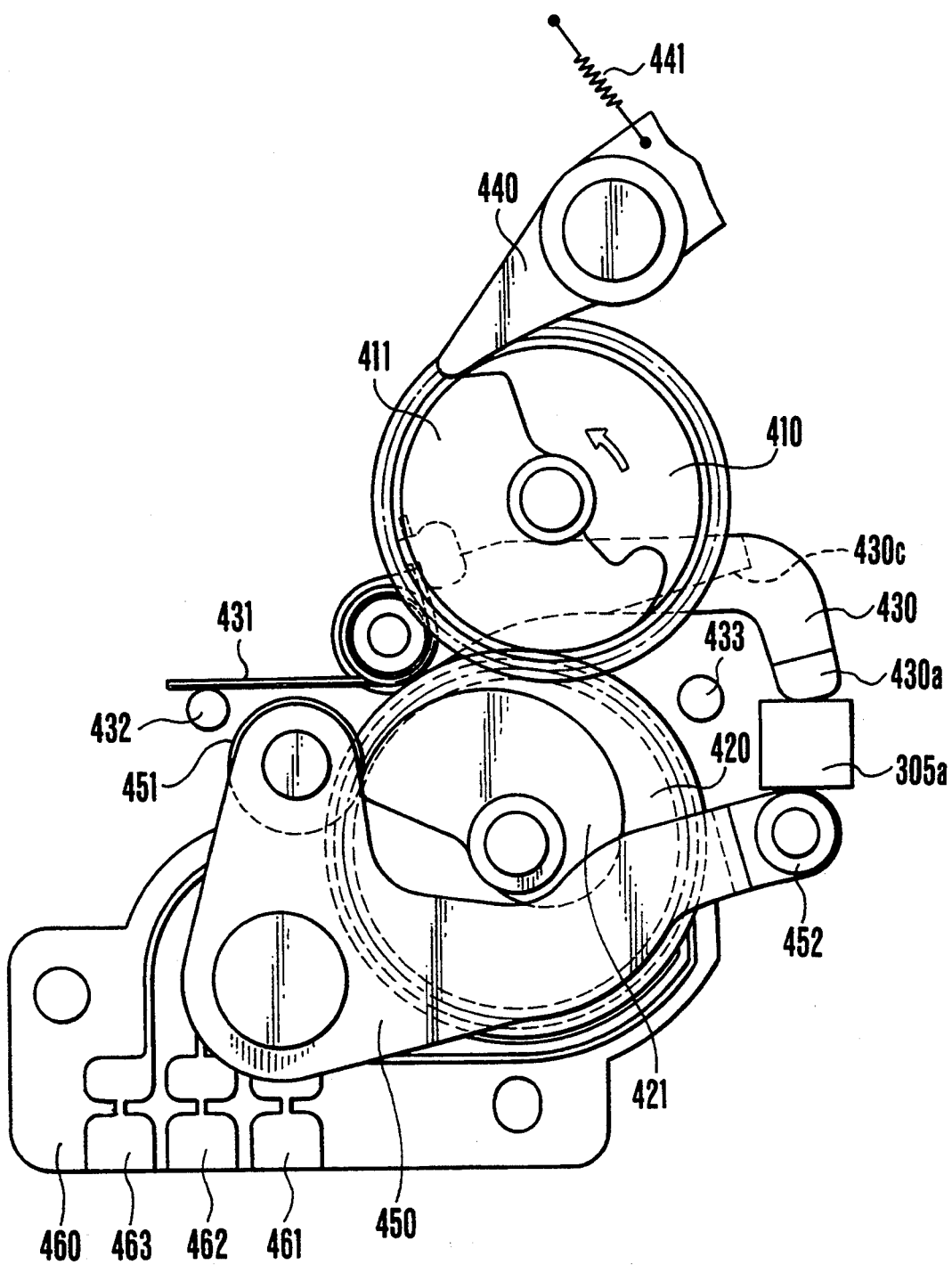
FIG. 12 shows a third embodiment of the invention.

FIG. 12 shows a third embodiment of this invention. In the case of the third embodiment, the return cam 412 of the mirror driving gear 410 and the pin 430b of the return lever 430 employed in the second embodiment shown in FIGS. 10 and 11 are omitted. The return lever 430 is arranged to be turned clockwise solely by means of the spring 431. In this case, the spring 431 must be arranged to be capable of singly returning the seesaw lever 305. However, compared with the conventional arrangement of using a spring member alone for this purpose, the third embodiment is arranged to effectively reduce a loss of energy.

While the first, second and third embodiments of this invention have been described in the foregoing, any one of them can be selected by taking into consideration the force required for returning the seesaw lever 305, the driving system and the available space of the camera, etc.

It is conceivable, for a further embodiment of the invention, to replace the shutter shown in FIGS. 6 and 7 with a shutter of a different type, wherein the movement of a driving lever is controlled by arranging an armature on a driving lever to be directly sucked by an electromagnet and to be released from the sucked state in response to a release signal. In this case, control over the amount of overcharging becomes more severe than in the case of the shutter of the type shown in FIGS. 6 and 7. Since the final stroke of the charging lever comes closer to the upper dead point to completely prevent the generation of any force in the direction of return, the advantageous effect of the second returning means of the first embodiment can be enhanced.

In accordance with the arrangement of the embodiments described, the shutter charging member can be returned with a weaker spring force. The use of the weaker spring force gives the following advantages:

(1) Mitigation of the sound made when the charging member is returned.

(2) Mitigation of the vibrations taking place when the charging member is returned.

(3) Reduction in loss of energy for charging.

The invention is highly advantageous in increasing the traveling speed of shutter curtains for a higher shutter speed.

What is claimed is:

1. A camera comprising:
 a) a camera mechanism including a charging member operable in a reciprocating motion between a charging position and a charging-cancelling position;
 b) a motor for driving said charging member from the charging-cancelling position to the charging position;

c) a first driving mechanism for driving said charging member from the charging position to the charging-cancelling position; and d) a second driving mechanism for driving said charging member only in an initial stage of a process of moving said charging member from the charging position to the charging-cancelling position.

2. A camera according to claim 1, wherein said first driving mechanism comprises a spring as a drive source for driving said charging member from the charging position to the charging-cancelling position.

3. A camera according to claim 1, wherein said second driving mechanism is arranged to drive said charging member by using said motor as a drive source only in the initial stage of the process of moving said charging member from the charging position to the charging-cancelling position.

4. A camera according to claim 2, wherein said second driving mechanism is arranged to drive said charging member by using said motor as a drive source only in the initial stage of the process of moving said charging member from the charging position to the charging-cancelling position.

5. A camera according to claim 1, wherein said second driving mechanism comprises a second spring as a drive source for driving said charging member only in the initial stage of the process of moving said charging member from the charging position to the charging-cancelling position.

6. A camera according to claim 2, wherein said second driving mechanism comprises a second spring as a drive source for driving said charging member only in the initial stage of the process of moving said charging member from the charging position to the charging-cancelling position.

7. A camera according to claim 1, wherein said camera mechanism is a shutter mechanism.

8. A camera according to claim 2, wherein said camera mechanism is a shutter mechanism.

9. A camera according to claim 3, wherein said camera mechanism is a shutter mechanism.

10. A camera according to claim 4, wherein said camera mechanism is a shutter mechanism.

11. A camera according to claim 5, wherein said camera mechanism is a shutter mechanism.

12. A camera according to claim 6, wherein said camera mechanism is a shutter mechanism.

13. A camera according to claim 7, wherein said motor drives said charging member in the reciprocating motion by rotating in one direction.

14. A camera according to claim 9, wherein said charging member is driven from the charging-cancelling position to the charging position by a cam displacement of a first cam member which is rotated by rotation of said motor, and wherein said second driving mechanism drives said charging member only in the initial stage of the process of moving said charging member from the charging position to the charging-cancelling position by a cam displacement of a second cam member which is rotated by rotation of said motor.

15. A camera according to claim 10, wherein said charging member is driven from the charging-cancelling position to the charging position by a cam displacement of a first cam member which is rotated by rotation of said motor, and wherein said second driving mechanism drives said charging member only in the initial stage of the process of moving said charging member from the charging position to the charging-cancelling position by a cam displacement of a second cam member which is rotated by rotation of said motor.

16. A camera comprising:

a) a shutter having a charging member operable in a reciprocating motion between a charging position and a pre-exposure retracted position;

b) a spring mechanism for urging said charging member to move from the charging position to the pre-exposure retracted position;

c) a charging mechanism including a motor as a driving source for driving said charging member against an urging force of said spring mechanism from the pre-exposure retracted position to the charging position; and d) a driving mechanism for driving said charging member only in an initial stage of a process of moving said charging member from the charging position to the pre-exposure retracted position.

17. A camera according to claim 16, wherein said driving mechanism comprises a motor as a drive source for driving said charging member only in the initial stage in the process of moving said charging member from the charging position to the pre-exposure retracted position.

18. A camera according to claim 16, wherein the motor of said charging mechanism also is used as a drive source for driving said charging member only in the initial stage in the process of moving said charging member from the charging position to the pre-exposure retracted position.

19. A camera comprising:

a) a camera mechanism including a charging member operable in a reciprocating motion between a charging position and a charging-cancelling position;

b) a drive source for driving said charging member from the charging-cancelling position to the charging position;

c) a first driving mechanism including a spring as a drive source for driving said charging member from the charging position to the charging-cancelling position; and d) a second driving mechanism including a motor as a drive source for driving said charging member from the charging position to the charging-cancelling position.

20. A camera according to claim 19, wherein said the motor of said second driving mechanism drives said charging member only in an initial stage of a process of moving said charging member from the charging position to the charging-cancelling position.

21. A camera according to claim 19, wherein said camera mechanism is a shutter mechanism.

22. A camera according to claim 20, wherein said camera mechanism is a shutter mechanism.

23. A camera according to claim 21, wherein said motor drives said charging member in the reciprocating motion by rotating in one direction.

* * * * *

UNITED STATES PATENT AND TRADEMARK OFFICE
CERTIFICATE OF CORRECTION

PATENT NO. 5,361,110
DATED : November 1, 1994
INVENTOR(S) : HARAGUCHI

It is certified that error appears in the above-indentified patent and that said Letters Patent is hereby corrected as shown below:

Column 6

Line 46, "The" should read --the--.

Column 8

Line 37, "downward." should read --downward).--.

Column 13

Line 20, "blades" should read --blade--.

UNITED STATES PATENT AND TRADEMARK OFFICE
CERTIFICATE OF CORRECTION

PATENT NO. : 5,361,110
DATED : November 1, 1994
INVENTOR(S) : HARAGUCHI

It is certified that error appears in the above-indentified patent and that said Letters Patent is hereby corrected as shown below:

<u>Column 16</u>

Line 10, "is" should read --are--.

<u>Column 18</u>

Line 37, "sucked" should read --attracted--.
Line 38, "sucked" should read --attracted--.

Signed and Sealed this

Sixteenth Day of May, 1995

BRUCE LEHMAN

*Attest:*

*Attesting Officer*          *Commissioner of Patents and Trademarks*